United States Patent Office 3,020,319
Patented Feb. 6, 1962

---

3,020,319
PREPARING 2,2-DINITRO-1,3-PROPANEDIOL
Karl Klager, Monrovia, and Gustave B. Linden, Los Angeles, Calif., assignors to Aerojet-General Corporation, Azusa, Calif., a corporation of Ohio
No Drawing. Filed Nov. 16, 1953, Ser. No. 392,477
3 Claims. (Cl. 260—635)

This invention relates to a method for the preparation of 2,2-dinitro-1,3-propanediol having a high degree of purity.

2,2-dinitro-1,3-propanediol has long been known as a valuable starting material for the production of nitro-containing polymers, explosives and various other nitro-containing organic compositions. However, all of the known methods for its production yield a product of such low purity as to render it completely unsuitable for polymerization purposes. Therefore the use of 2,2-dinitropropanediol has been considerably restricted owing to the lack of the material in a highly purified state.

Heretofore technical grade 2,2-dinitropropanediol has been prepared in accordance with the following general reaction scheme:

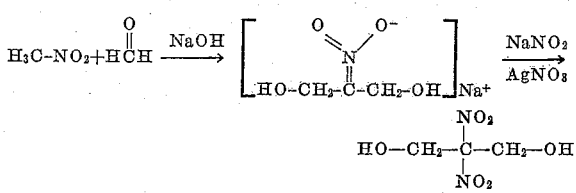

Nitromethane is condensed with formaldehyde in the presence of sodium hydroxide to yield the sodium salt of 2-nitro-1,3-propanediol which is then nitrated with sodium nitrite and silver nitrate to yield the desired 2,2-dinitro-1,3-propanediol. Although being a somewhat involved procedure, fair yields are obtained, however due to difficulties in separation, the product recovered is generally of less than 95% purity, and hence unsuitable for polymerization purposes.

We have now found that 2,2-dinitropropanediol of better than 99.7% purity may easily be prepared from 2,2 - dimethyl-5-hydroxymethyl-5-nitro-1,3-dioxane. 2,2-dimethyl-5-hydroxymethyl - 5 - nitro-1,3-dioxane is readily prepared in the conventional manner through the action of trishydroxymethyl nitromethane upon acetone in the presence of a catalyst.

2,2-dinitro-1,3-propanediol is obtained in high purity from the dioxane in accordance with the general reaction scheme set forth below:

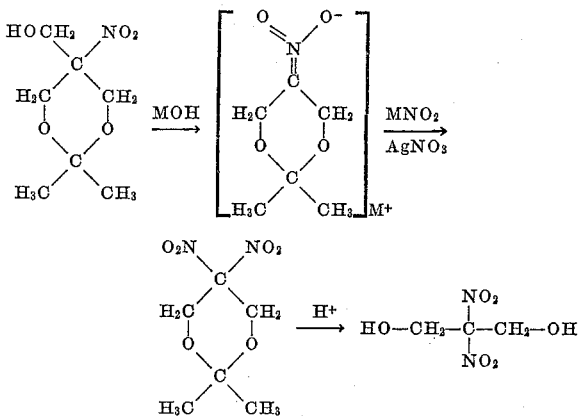

wherein M is an alkali or alkaline earth metal. 2,2-dimethyl - 5 - hydroxymethyl-5-nitro-1,3-dioxane is converted to its corresponding metal salt by the action of an alkali metal or alkaline earth metal hydroxide. The metal salt is then converted to the neutral dinitro compound through the action of a nitrite salt in the presence of silver nitrate which may then be acid hydrolyzed to the desired 2,2-dinitro-1,3-propanediol.

Since the conversion to the metal salt is a reversible reaction, it is usually desirable to conduct this reaction in the presence of ammonium hydroxide in order to obtain a more favorable equilibrium.

In the conversion of the nitronate salt to the dinitro compound, it is not necessary to isolate the metal salt, hence the metal nitrite and silver nitrate may be added directly to the reaction mass. Best results are obtained when the nitrite salt is employed in a ratio of from about 1:1 to 1.5:1 moles with the nitronate, and the silver nitrate in a mole ratio of from about 1:1 to 3:1 moles. It is preferred that the reaction temperature be maintained within a range of from about 5.0° to about 70° C. The 2,2-dimethyl-5,5-dinitro-1,3-dioxane is easily recovered by extraction with a suitable solvent such as benzene. The product is a stable crystalline substance, which is easily isolated in a high state of purity by conventional methods, such as steam distillation and recrystallization.

To more fully define our invention the following examples are presented. It is to be understood however that these examples are presented purely as a means of illustration and are not intended to limit the scope of our invention.

EXAMPLE I

*Conversion of 2,2-dimethyl-5-nitro-5-hydroxymethyl-1,3-dioxane into 2,2-dimethyl-5,5-dinitro-1,3-dioxane*

A reactor fitted with a stirrer and a thermometer was charged with 191 grams (1.0 mole) 2,2-dimethyl-5-hydroxymethyl-5-nitro-1,3-dioxane and 400 ml. water. Over a period of about half an hour 58 ml. (1.1 moles) of a 50% sodium hydroxide solution, accompanied by vigorous stirring, were dropped into the mixture. The pH of the resulting mixture was 11.8 and considerable amount of material remained undissolved. Concentrated ammonium hydroxide, 44.5 ml. (0.667 mole), was dropped into the reaction mixture over a period of half an hour and most of the solid material dissolved. The pH remained at 11.8. The temperature of the mixture was maintained at about 38° C. for a period of half an hour. A solution of 75 grams (1.0 mole) technical sodium nitrite in 200 ml. of water was added to the mixture, which was then filtered through glass wool, further diluted with 200 ml. water and warmed to 42° C. The reaction mixture was then added, with vigorous stirring and as rapidly as possible, to a solution of 340 grams (2 moles) silver nitrate in two liters of water warmed to a temperature of 43° C. The temperature of the combined solutions rose to 51° C. and a grey-black precipitate formed almost instantly. The mixture was stirred for half an hour while the temperature was maintained at about 40° C. it was then cooled to room temperature. After it had been stirred for half an hour, 700 ml. of benzene were added and the mixture stirred for twenty minutes, while the temperature was maintained between about 40° C. to about 41° C. The mixture was filtered and the benzene layer was separated, concentrated and steam distilled. The yield was 140 grams (68%) of colorless material, M.P. 54° to 55° C.

EXAMPLE II

*Hydrolysis of 2,2-dimethyl-5,5-dinitro-1,3-dioxane to pure 2,2-dinitro-1,3-propanediol*

A flask was charged with 62 grams of the recrystallized 2,2-dimethyl-5,5-dinitro-1,3-dioxane, 80 ml. water, 20 ml. methanol and 3 ml. concentrated hydrochloric acid. Upon heating the mixture to reflux temperature, a homogeneous solution formed. After refluxing for nine hours, the solution was evaporated to dryness. The crude product, after final drying in a desiccator over potassium hydroxide, weighed 49.5 g. (100% of theoretical). Recrystallization from ethylene dichloride yielded the glycol in a purity of 99.7%.

It is evident from the examples given above that any of the alkali metal or alkaline earth metal hydroxides may be used in place of sodium hydroxide in the preparation of the nitronate salt. Similarly it is evident that any of the alkali or alkaline earth metal nitrites may be used to prepare the dinitro dioxane compound without departing from the scope of this invention, these metals being well established as equivalents for such reactions.

We have discovered a convenient, efficient and economically valuable process for the preparation of 2,2-dinitro-1,3-propanediol in a high pure state. By the application of our method of preparation, pure 2,2-dinitropropanediol may be produced in commercial quantities and made readily available as a starting material for a wide range of organic synthesis.

We claim:
1. The method of preparing 2,2-dinitro-1,3-propanediol which comprises reacting 2,2-dimethyl-5-hydroxymethyl-5-nitro-1,3-dioxane with a base selected from the group consisting of alkali metal and alkaline earth metal hydroxides to yield a salt; subsequently reacting said salt with a nitrite salt selected from the group consisting of alkali metal and alkaline earth metal nitrite salts in the presence of silver nitrate to yield a dinitro dioxane; and subsequently acid hydrolyzing said dinitro dioxane to the desired 2,2-dinitro-1,3-propanediol.

2. The method of preparing 2,2-dinitro-1,3-propanediol which comprises adding sodium hydroxide to 2,2-dimethyl-5-hydroxymethyl-5-nitro-1,3-dioxane; reacting the resultant salt with sodium nitrite in the presence of silver nitrate and hydrolyzing the 2,2-dimethyl-5,5-dinitro-1,3-dioxane so obtained in the presence of hydrochloric acid to yield the desired 2,2-dinitro-1,3-propanediol.

3. The method of preparing 2,2-dinitro-1,3-propanediol which comprises reacting 2,2-dimethyl-5-hydroxymethyl-5-nitro-1,3-dioxane with a base selected from the group consisting of alkali metal and alkaline earth metal hydroxides in the presence of ammonium hydroxide to yield a salt; subsequently reacting said salt with a nitrite salt selected from the group consisting of alkali metal and alkaline earth metal nitrite salts in the presence of silver nitrate to yield a dinitro dioxane; and subsequently acid hydrolyzing said dinitro dioxane to the desired 2,2-dinitro-1,3-propanediol.

References Cited in the file of this patent

UNITED STATES PATENTS

| | | |
|---|---|---|
| 2,307,894 | Mikeska | Jan. 12, 1943 |
| 2,522,959 | Plant | Sept. 19, 1950 |

OTHER REFERENCES

Wertheim: Textbook of Organic Chemistry, 2nd Ed., The Blakiston Co., Phila. (1945), p. 199.